US009681261B2

(12) United States Patent
Lee

(10) Patent No.: US 9,681,261 B2
(45) Date of Patent: Jun. 13, 2017

(54) METHOD AND APPARATUS OF PROVIDING INTEGRITY PROTECTION FOR PROXIMITY-BASED SERVICE DISCOVERY WITH EXTENDED DISCOVERY RANGE

(71) Applicant: LG ELECTRONICS INC., Seoul (KR)

(72) Inventor: Ki-Dong Lee, San Diego, CA (US)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/069,061

(22) Filed: Oct. 31, 2013

(65) Prior Publication Data

US 2014/0119544 A1 May 1, 2014

Related U.S. Application Data

(60) Provisional application No. 61/721,023, filed on Nov. 1, 2012.

(51) Int. Cl.
*H04W 12/04* (2009.01)
*H04W 4/02* (2009.01)
(Continued)

(52) U.S. Cl.
CPC ............... *H04W 4/02* (2013.01); *H04L 63/12* (2013.01); *H04W 12/04* (2013.01); *H04W 12/06* (2013.01);
(Continued)

(58) Field of Classification Search
CPC ....... H04W 4/02; H04W 12/10; H04W 12/04; H04W 76/023; H04W 8/005; H04W 12/06; H04L 63/12
See application file for complete search history.

(56) References Cited

U.S. PATENT DOCUMENTS

2002/0152384 A1* 10/2002 Shelest et al. ................. 713/176
2003/0092425 A1* 5/2003 Okazaki et al. .............. 455/411
(Continued)

FOREIGN PATENT DOCUMENTS

KR 10-2005-0101110 A 10/2005
KR 10-2012-0027296 A 3/2012
(Continued)

OTHER PUBLICATIONS

J. Arkko et al., "SEcure Neighbor Discovery (SEND)," RCE 3971, Mar. 2005 (attached to the instant office action as rfc3971.pdf).*
(Continued)

*Primary Examiner* — Tri Tran
(74) *Attorney, Agent, or Firm* — Birch, Stewart, Kolasch & Birch, LLP

(57) ABSTRACT

The present invention is directed to a method and an apparatus for use in a wireless communication system, specifically, the method is directed to perform a ProSe discovery procedure by a first ProSe-enabled UE in a cellular communication system, the method comprising: encrypting a payload of a discovery signal by using a private key of the first ProSe-enabled UE; adding a public key of the first ProSe-enabled UE to the payload of the discovery signal; and transmitting the discovery signal including the payload and the public key of the first ProSe-enabled UE to one or more second ProSe-enabled UEs, wherein the public key of the first ProSe-enabled UE is used for the one or more second ProSe-enabled UEs to decrypt the payload of the discovery signal.

4 Claims, 15 Drawing Sheets

(51) Int. Cl.
  *H04W 12/10* (2009.01)
  *H04W 12/06* (2009.01)
  *H04L 29/06* (2006.01)
  *H04W 8/00* (2009.01)
  *H04W 76/02* (2009.01)

(52) U.S. Cl.
  CPC ............ *H04W 12/10* (2013.01); *H04W 8/005* (2013.01); *H04W 76/023* (2013.01)

(56) References Cited

U.S. PATENT DOCUMENTS

| | | | |
|---|---|---|---|
| 2004/0117623 A1* | 6/2004 | Kalogridis | H04L 63/0807 713/165 |
| 2005/0123141 A1 | 6/2005 | Suzuki | |
| 2005/0160292 A1 | 7/2005 | Batthish et al. | |
| 2007/0038873 A1 | 2/2007 | Oliveira et al. | |
| 2009/0119407 A1* | 5/2009 | Krishnan | 709/228 |
| 2010/0017608 A1* | 1/2010 | Larsen | H04L 41/12 713/168 |
| 2010/0235689 A1 | 9/2010 | Tian et al. | |
| 2011/0041003 A1 | 2/2011 | Pattar et al. | |
| 2012/0047361 A1 | 2/2012 | Erdmann et al. | |

FOREIGN PATENT DOCUMENTS

| | | | |
|---|---|---|---|
| KR | 10-2012-0036350 A | 4/2012 | |
| WO | WO 2008072211 A2 * | 6/2008 | ............ H04L 41/12 |

OTHER PUBLICATIONS

T. Aura, "Cryptographically Generated Addresses (CGA)," RCE 3972, Mar. 2005 (attached to the instant office action as rfc3972.pdf).*

* cited by examiner

METHOD AND APPARATUS OF PROVIDING INTEGRITY PROTECTION FOR PROXIMITY-BASED SERVICE DISCOVERY WITH EXTENDED DISCOVERY RANGE

CROSS REFERENCE TO RELATED APPLICATIONS

This nonprovisional application claims the benefit of U.S. Provisional Application No. 61/721,023 filed on Nov. 1, 2012. The entire contents of the above application is hereby incorporated by reference.

TECHNICAL FIELD

The present invention is directed to a method and an apparatus for use in a wireless communication system. Specifically, the present invention is directed to a method and an apparatus of providing integrity protection for proximity-based service discovery with extended discovery range.

Background Art

Generally, a wireless communication system is being developed to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, a Multi Carrier Frequency Division Multiple Access (MC-FDMA) and the like.

DISCLOSURE

Technical Problem

An object of the present invention is to provide a method and an apparatus of providing integrity protection for proximity-based service discovery with extended discovery range.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

As an aspect of the present invention, A method of performing a Proximity-based Service (ProSe) discovery procedure by a first ProSe-enabled User Equipment (UE) in a cellular communication system is provided, in which the method comprises: encrypting a payload of a discovery signal by using a private key of the first ProSe-enabled UE; adding a public key of the first ProSe-enabled UE to the payload of the discovery signal; and transmitting the discovery signal including the payload and the public key of the first ProSe-enabled UE to one or more second ProSe-enabled UEs, wherein the public key of the first ProSe-enabled UE is used for the one or more second ProSe-enabled UEs to decrypt the payload of the discovery signal.

As another aspect of the present invention, a first Public Safety Proximity-based Service (ProSe)-enabled User Equipment (UE) configured to perform a ProSe discovery in a wireless communication system is provided, in which the first Public Safety ProSe-enabled UE comprises: a radio frequency (RF) unit; and a processor, wherein the processor is configured: to encrypt a payload of a discovery signal by using a private key of the first ProSe-enabled UE ProSe-enabled UE, to add a public key of the first ProSe-enabled UE to the payload of the discovery signal, and to transmit the discovery signal including the payload and the public key of the first ProSe-enabled UE to one or more second ProSe-enabled UEs, wherein the public key of the first ProSe-enabled UE is used for the one or more second ProSe-enabled UEs to decrypt the payload of the discovery signal.

Preferably, the aspects may further comprise: receiving a response signal in response to the discovery signal, wherein the response signal includes a payload encrypted by a private key of a third ProSe-enabled UE and a public key of the third ProSe-enabled UE.

Preferably, the aspects may further comprise: extracting the public key of the third ProSe-enabled UE from the response signal; and decrypting the payload of the response signal by using the public key of the third ProSe-enabled UE.

Preferably, the payload in the discovery signal may include an authentication request including a random number and an authentication token.

Advantageous Effects

Exemplary embodiments of the present invention have the following effects. In accordance with the embodiments of the present invention, integrity protection for proximity-based service discovery with extended discovery range is provided.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

MODE FOR INVENTION

Reference will now be made in detail to the preferred embodiments of the present invention with reference to the accompanying drawings. The detailed description, which will be given below Referring to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. The LTE-Advanced (LTE-A) is an evolved version of 3GPP LTE.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

Figure 1:
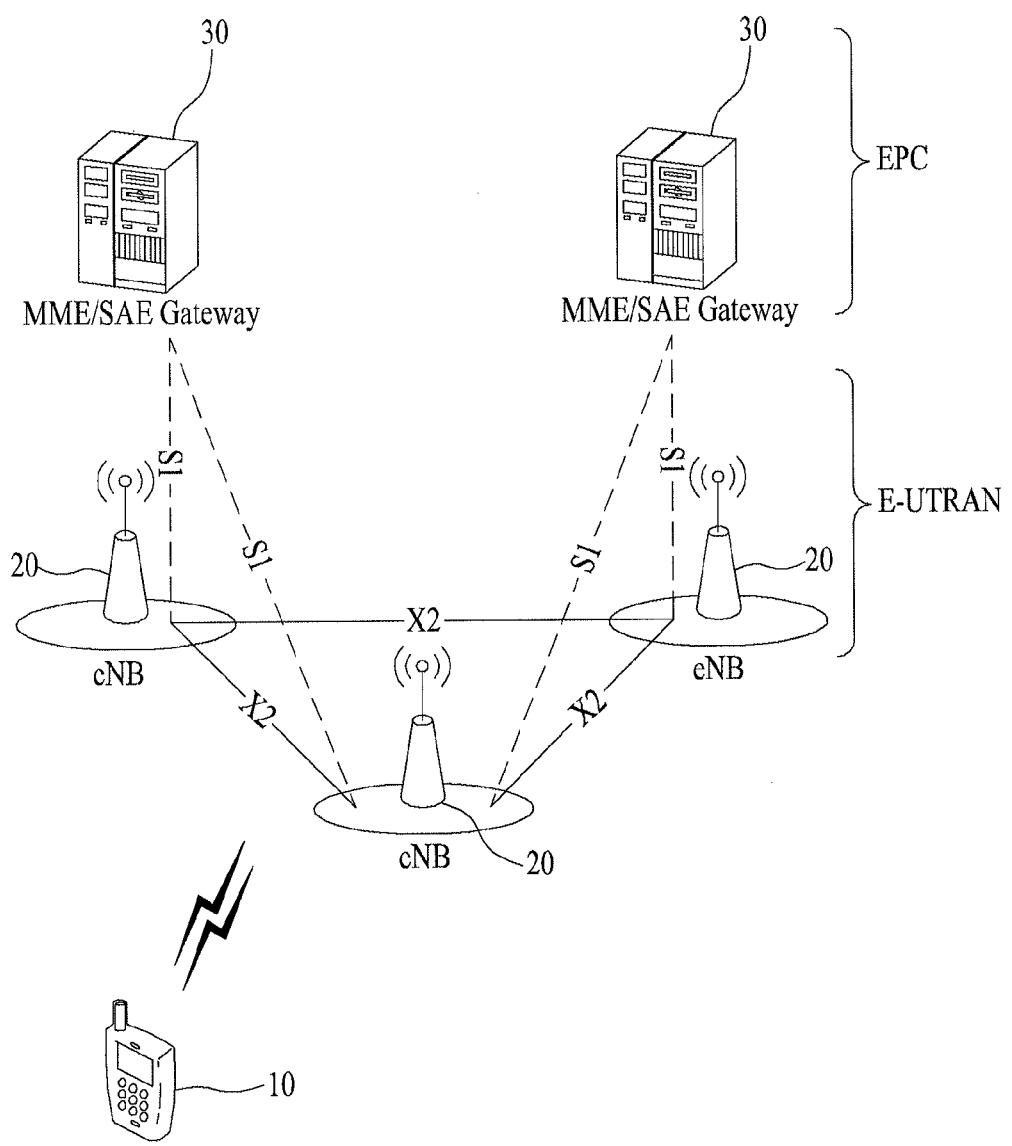
FIG. 1 shows a network structure of an Evolved Universal Terrestrial Radio Access Network (E-UTRAN).

FIG. 1 illustrates a network structure of an E-UMTS. The E-UMTS may be also referred to as an LTE system. The E-UMTS is widely deployed to provide a variety of communication services such as voice and packet data, and is generally configured to function based upon the various techniques presented herein and discussed in more detail with regard to later figures.

Referring to FIG. 1, the E-UMTS network includes an Evolved UMTS Terrestrial Radio Access Network (E-UTRAN), an Evolved Packet Core (EPC), and one or more mobile terminals (or User Equipment (UE)) 10. The E-UTRAN includes one or more eNodeBs (eNBs) 20. Regarding the EPC, Mobility Management Entity/System Architecture Evolution (MME/SAE) gateway 30 provides an end point of a session and mobility management function for the UE 10. The eNB 20 and the MME/SAE gateway 30 may be connected via an S1 interface.

The UE 10 is a communication device carried by a user and may also be referred to as a Mobile Station (MS), a User Terminal (UT), a Subscriber Station (SS) or a wireless device. In general, the UE includes a transmitter and processor, among other components, and is configured to operate in accordance with the various techniques presented herein.

The eNB 20 is generally a fixed station that communicates with the UE 10. In addition to being referred to as a base station, the eNB 20 may also be referred to as an access point. An eNB 20 provides end points of a user plane and a control plane to the UE 10. In general, the eNB includes a transmitter and processor, among other components, and is configured to operate in accordance with the various techniques presented herein.

A plurality of UEs 10 may be located in one cell. One eNB 20 is typically deployed per cell. An interface for transmitting user traffic or control traffic may be used between eNBs 20. Here, "downlink (DL)" refers to communication from the eNB 20 to the UE 10, and "uplink (UL)" refers to communication from the UE to the eNB.

The MME gateway 30 provides various functions including distribution of paging messages to eNBs 20, security control, idle state mobility control, SAE bearer control, and ciphering and integrity protection of Non-Access Stratum (NAS) signaling. The SAE gateway 30 provides assorted functions including termination of U-plane packets for paging reasons, and switching of the U-plane to support UE mobility.

A plurality of nodes may be connected between eNB 20 and gateway 30 via the S1 interface. The eNBs 20 may be connected to each other via an X2 interface and neighboring eNBs may have a meshed network structure that has the X2 interface.

Figure 2:
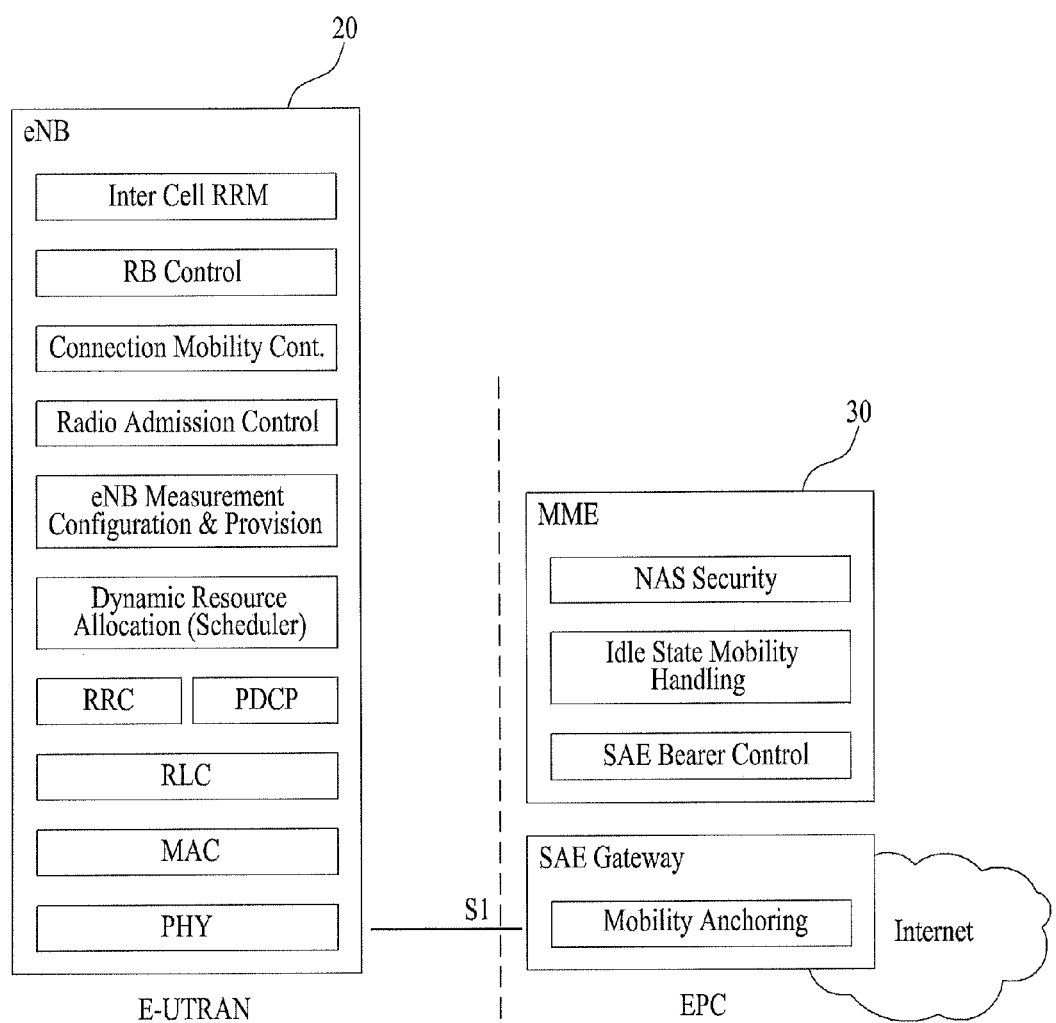
FIG. 2 shows a general functional structure of a typical E-UTRAN and that of a typical Evolved Packet Core (EPC).

FIG. 2 is a block diagram depicting general structures of an E-UTRAN and an EPC. Referring to FIG. 2, eNB 20 may perform functions of selection for MME/SAE gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, Radio Admission Control (RAC), and connection mobility control in LTE_ACTIVE state.

In the EPC, and as described above, MME/SAE gateway 30 may perform functions of paging origination, LTE-IDLE state management, ciphering of the user plane, SAE bearer control, and ciphering and integrity protection of NAS signaling.

Figure 3A:
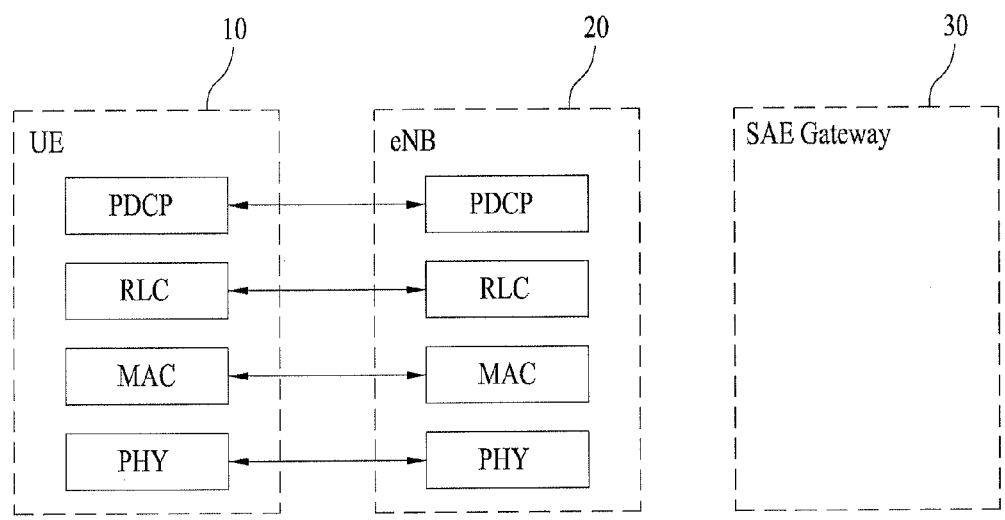
FIGS. 3a~3b show a user-plane protocol and a control-plane protocol stack for the E-UMTS network.
Figure 3B:
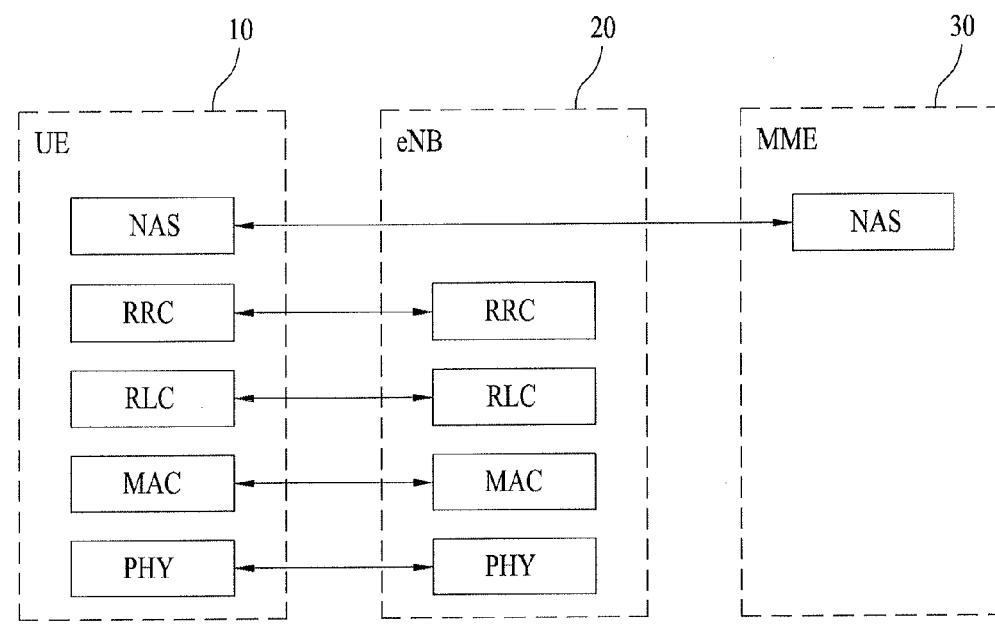

FIGS. 3a~3b illustrate the user-plane protocol and the control-plane protocol stack for the E-UMTS network. Referring to FIGS. 3a~3b, the protocol layers may be divided into a first layer (L1), a second layer (L2) and a third layer (L3) based upon the three lower layers of an Open System Interconnection (OSI) standard model as known in the art of communication systems.

The first layer L1 (or the physical layer) provides an information transmission service to an upper layer using a physical channel. The physical layer is connected with a Medium Access Control (MAC) layer through a transport channel, and data between the MAC layer and the physical layer are transferred via the transport channel. Between different physical layers, namely, between physical layers of a transmission side and a reception side (for example, between physical layers of UE 10 and eNB 20), data are transferred via the physical channel.

The MAC layer of Layer 2 (L2) provides services to a Radio Link Control (RLC) layer via a logical channel. The RLC layer of Layer 2 (L2) supports a reliable transmission of data. Although the RLC layer is shown in FIGS. 3a~3b as being separate from the MAC layer, it is understood that the functions of the RLC layer may be performed by the MAC layer and that, therefore, a separate RLC layer is not required. Referring to FIG. 3a, the Packet Data Convergence Protocol (PDCP) layer of Layer 2 (L2) performs a header compression function that reduces unnecessary control information such that data being transmitted by employing Internet Protocol (IP) packets, such as IPv4 or IPv6, can be efficiently sent over a radio (wireless) interface that has a relatively narrow bandwidth.

Referring to FIG. 3b, a Radio Resource Control (RRC) layer located at the lowest portion of the third layer (L3) is typically only defined in the control plane and controls logical channels, transport channels and the physical channels in relation to the configuration, reconfiguration, and release of the Radio Bearers (RBs). Here, the RB means a service provided by the second layer (L2) for data transmission between the terminal and the E-UTRAN.

Referring to FIG. 3a, the RLC and MAC layers (terminated in an eNB 20 on the network side) may perform functions such as Scheduling, Automatic Repeat reQuest (ARQ), and Hybrid Automatic Repeat reQuest (HARQ). The PDCP layer (terminated in eNB 20 on the network side) may perform the user plane functions such as header compression, integrity protection, and ciphering.

Referring to FIG. 3b, the RLC and MAC layers (terminated in an eNB 20 on the network side) perform the same or similar functions as for the control plane. The RRC layer (terminated in an eNB 20 on the network side) may perform functions such as broadcasting, paging, RRC connection management, RB control, mobility functions, and UE measurement reporting and controlling. The NAS control protocol (terminated in the MME 30 on the network side) may perform functions such as a SAE bearer management, authentication, LTE_IDLE mobility handling, paging origination in LTE_IDLE, and security control for the signaling between the gateway and UE 10.

The NAS control protocol may use three different states: first, a LTE_DETACHED state if there is no RRC entity; second, a LTE_IDLE state if there is no RRC connection while storing minimal UE information; and third, an LTE_ACTIVE state if the RRC connection is established.

Thus RRC state may be divided into two different states such as an RRC_IDLE state and an RRC_CONNECTED state. In the RRC_IDLE state, the UE 10 may receive broadcasts of system information and paging information while the UE specifies a Discontinuous Reception (DRX) configured by NAS, and the UE has been allocated an identification (ID) (e.g., System Architecture Evolution-Temporary Mobile Subscriber Identity (S-TMSI)) which uniquely identifies the UE in a tracking area. Also, in the RRC-IDLE state, no RRC context is stored in the eNB.

In the RRC_IDLE state, the UE 10 specifies the paging DRX (Discontinuous Reception) cycle. Specifically, the UE 10 monitors a paging signal at a specific paging occasion of every UE specific paging DRX cycle.

In the RRC_CONNECTED state, the UE 10 has an E-UTRAN RRC connection and a RRC context is stored in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, and the network can control mobility (handover) of the UE.

Figure 4:
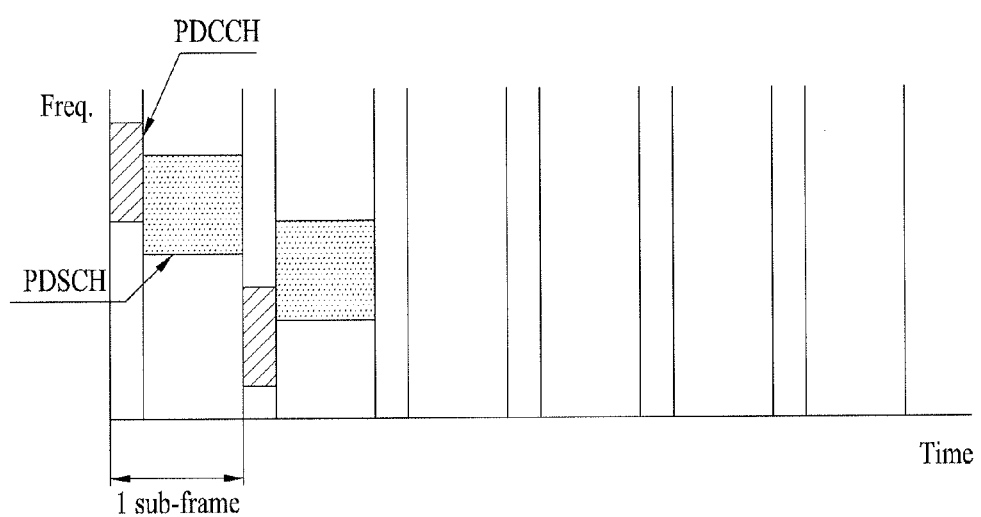
FIG. 4 shows a downlink subframe and physical channels.

FIG. 4 illustrates a downlink subframe and physical channels.

Referring to FIG. 4, the downlink subframe includes a plurality of slots (e.g., two). The number of OFDM symbols included in one slot may be changed according to the length of a Cyclic Prefix (CP). For example, in case of a normal CP, the slot may include seven OFDM symbols. The downlink subframe is divided into a data region and a control region in a time domain. A maximum of three (or four) OFDM symbols located in the front part of a first slot of the subframe may correspond to a control region to which a control channel is allocated. The remaining OFDM symbols correspond to a data region to which a Physical Downlink Shared Channel (PDSCH) is allocated. A variety of downlink control channels may be used in LTE/LTE-A, for example, a Physical Control Format Indicator Channel (PCFICH), a Physical Downlink Control Channel (PDCCH), a Physical hybrid ARQ indicator Channel (PHICH), etc. The PCFICH is transmitted on the first OFDM symbol of the subframe, and carries information about the number of OFDM symbols used for transmitting control channels within the subframe. The PHICH carries a Hybrid Automatic Repeat reQuest Acknowledgment/Negative-Acknowledgment (HARQ ACK/NACK) signal as a response to an uplink transmission signal.

Control information transmitted over a PDCCH is referred to as Downlink Control Information (DCI). DCI includes resource allocation information for either a UE or a UE group and other control information. For example, DCI includes UL/DL scheduling information, an UL transmission (Tx) power control command, etc.

The PDCCH carries a variety of information, for example, transmission format and resource allocation information of a DownLink Shared Channel (DL-SCH), transmission format and resource allocation information of an UpLink Shared Channel (UL-SCH), paging information transmitted over a Paging Channel (PCH), system information transmitted over the DL-SCH, resource allocation information of an upper-layer control message such as a random access response transmitted over PDSCH, a set of Tx power control commands of each UE contained in a UE group, a Tx power control command, activation indication information of Voice over IP (VoIP), and the like. A plurality of PDCCHs may be transmitted within a control region. A UE can monitor a plurality of PDCCHs. A PDCCH is transmitted as an aggregate of one or more contiguous Control Channel Elements (CCEs). The CCE is a logical allocation unit that is used to provide a coding rate based on a radio channel state to a PDCCH. The CCE may correspond to a plurality of Resource Element Groups (REGs). The format of PDCCH and the number of PDCCH bits may be determined according to the number of CCEs. A Base Station (BS) decides a PDCCH format according to DCI to be sent to the UE, and adds a Cyclic Redundancy Check (CRC) to control information. The CRC is masked with an identifier (e.g., Radio Network Temporary Identifier (RNTI)) according to a PDCCH owner or a purpose of the PDCCH. For example, provided that the PDCCH is provided for a specific UE, a CRC may be masked with an identifier of the corresponding UE (e.g., cell-RNTI (C-RNTI)). If PDCCH is provided for a paging message, a CRC may be masked with a paging identifier (e.g., Paging-RNTI (P-RNTI)). If a PDCCH is provided for system information (e.g., System Information Block (SIB)), a CRC may be masked with system Information RNTI (SI-RNTI). If PDCCH is provided for a random access response, a CRC may be masked with Random Access-RNTI (RA-RNTI). For example, CRC masking (or scrambling) may be performed using an exclusive OR (XOR) operation between CRC and RNTI at a bit level.

To initiate access to the network, a random access procedure is used. The random access procedure is also referred to as a Random Access Channel (RACH) procedure. Physical Random Access Channel (PRACH) transmission is under control of higher layer protocol which performs some important functions related to priority and load control. The PRACH is a common physical channel dedicated to the random access procedure. There are two kinds of RACH procedures: contention-based RACH procedure and non-contention-based RACH procedure. In the contention-based RACH procedure, many UEs can attempt to access the same base station simultaneously using same RACH preamble/resources, which may lead to network access congestions/collisions. Hereinafter, unless mentioned otherwise, a RACH (or RA) procedure means a contention-based RACH (or RA) procedure.

A RACH procedure can be used for several purposes. For example the RACH procedure can be used to access the network, to request resources, to carry control information, to adjust the time offset of the uplink in order to obtain uplink synchronization, to adjust the transmitted power, etc.

A RACH procedure can be initiated by the UE or the eNB. The RACH procedure may, for instance, be triggered by the following events:

A UE switches from power-off to power-on and needs to be registered to the network.

A UE is not time-synchronized with an eNB and starts transmitting data (for instance the user calls).

An eNB starts transmitting data to the UE but they are not synchronized (for instance the user receives a call).

An eNB measures a delay of the received signal from the UE (for instance the user is moving and has lost synchronization).

Figure 5:
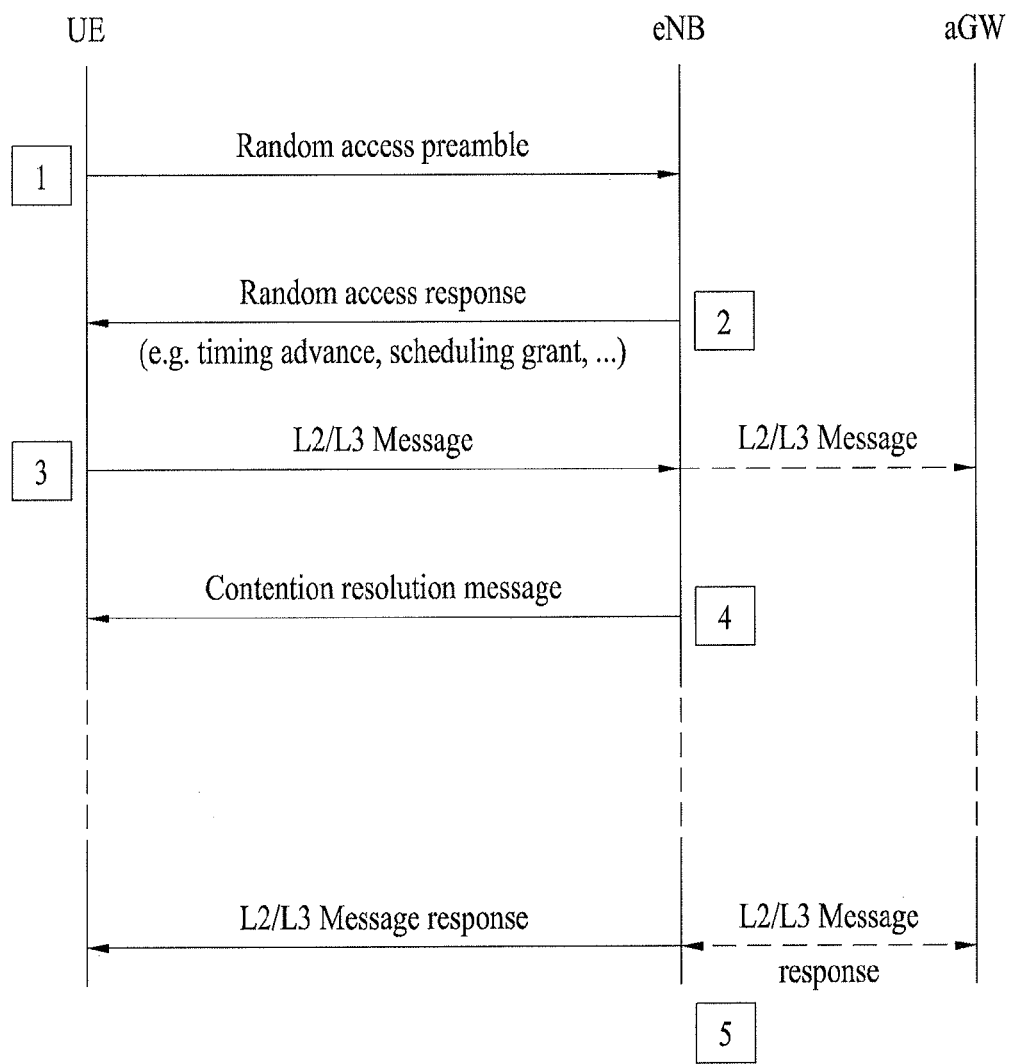
FIG. 5 shows a contention-based random access procedure.

FIG. 5 illustrates a contention-based random access procedure.

Referring to FIG. 5, firstly the UE retrieves information transmitted periodically from eNB on a downlink Broadcast Channel (BCH) and selects a preamble signature (e.g., Constant Amplitude Zero Auto-Correlation (CAZAC) sequence), a RACH time slot and a frequency band. The preamble signature is chosen by the UE from among a set of signatures known by the eNB. The UE generates a random access preamble (message 1, box 1) containing the chosen signature and transmits it to the eNB over the selected time slot at the selected frequency. The random access preamble is sent before a RACH connection request and indicates that the UE is about to transmit data. During the random access procedure, several UEs may share the same RACH channel (i.e., PRACH) and they are distinguished by preamble signatures. Congestions/collisions occur whenever several UEs choose the same signature and send it within the same time and frequency resources.

The eNB monitors the current RACH slot in an attempt to detect preambles transmitted from UEs in a corresponding cell. On reception of a signal, the eNB correlates the received signal in the RACH subframe with all possible signatures. Detection of the preamble can be either performed in the time domain or in the frequency domain. A detection variable is computed for each signature. If the detection variable exceeds a certain threshold, the preamble is considered detected.

The eNB sends a random access response (message 2, box 2) to acknowledge the successfully detected preambles. The random access response is sent via a downlink shared channel and includes the detected signature. The random access response also contains a timing advance command, a power-control command.

If the UE receives a random access response from the eNB, the UE decodes the random access response, and adapts UL transmission timing and UL transmission power if the random access response contains power control information. The UE then sends a resource request message (message 3, box 3) via an uplink shared channel. In the message 3, the UE requests bandwidth and time resources to transmit data and it also indicates a UE-specific identifier. When the UE requests resources, the UE uses a specific ID in the message 3 to resolve contentions. Then the UE monitors a specified downlink channel for response from the eNB. In the case of a positive resource grant, the subsequent transmissions are carried out as normal.

The eNB attempts to resolve any contentions. If the eNB receives a resource request with a UE-specific signature, the eNB checks how many UEs were detected with the same signature and resolves any possible contentions. If the preamble sent by a UE was in collision with a preamble from another UE, the eNB sends a contention resolution message (message 4, box 4) to command a corresponding UE to re-start the RACH procedure. If the UE was not in collision, the eNB sends a resource assignment message (message 5, box 5). Subsequent transmissions are carried out as usual.

Security is usually measured in terms of a set of basic aspects: confidentiality, integrity, authentication and authorization. Confidentiality of data is achieved by cryptographically transforming original data, often called, plaintext, into cipher text, which hides the content of plaintext. This operation is realized as a parameterized transformation that keeps the controlling parameter secret. The controlling parameter is often called a key. The transformation is called encryption. With a key, it is easy to perform the inverse transform or decryption. Without the key, decryption should be difficult. Integrity is about ensuring that data has not been replaced or modified without authorization during transport or storage. The integrity is achieved using cryptographic transforms and a key. Authentication is a procedure by which a unit (the claimant) convinces another unit (the verifier) of its (correct) identity. The authentication is different from authorization, which is the process of giving a person or entity permission to do or have access to something.

There are two major classes of cryptographic mechanisms: symmetric and asymmetric. In symmetric mechanisms, the same key is used for encryption and decryption.

Examples of symmetric confidentiality mechanisms are
  Block ciphers, such as Data Encryption Standard (DES) and Advanced Encryption Standard (AES); and
  Stream ciphers, such as the GSM A1, A2 and A3 algorithms.

Integrity is often protected using symmetric mechanisms. Integrity-protection algorithms are also called message authentication codes (MAC). The most popular MAC is the Hash calculation, MAC calculation (HMAC) algorithm. Key in symmetric mechanisms can be used to both encrypt and decrypt content, so it must be kept secret from all but legitimate users of the encryption scheme.

Asymmetric mechanisms use separate pairs of keys, i.e., private/public key pair, for encryption transform and decryption transform. A private key is used for encryption transform, and a paired public key is used for decryption transform. The public key can be made publicly available, but the private key must never be revealed. Asymmetric mechanisms are typically used for distributing keys (for example, a symmetric key) or for digital signing purposes. A public key can be used to encrypt a symmetric key, which in turn, can only be decrypted by the legitimate receiver using the corresponding private key. A private key may also be used to digitally sign data. The signature can be verified by anyone who knows the corresponding public key. The Rivest, Shamir & Adleman (RSA) scheme is widely known example of an asymmetric cryptographic algorithm.

Figure 6:
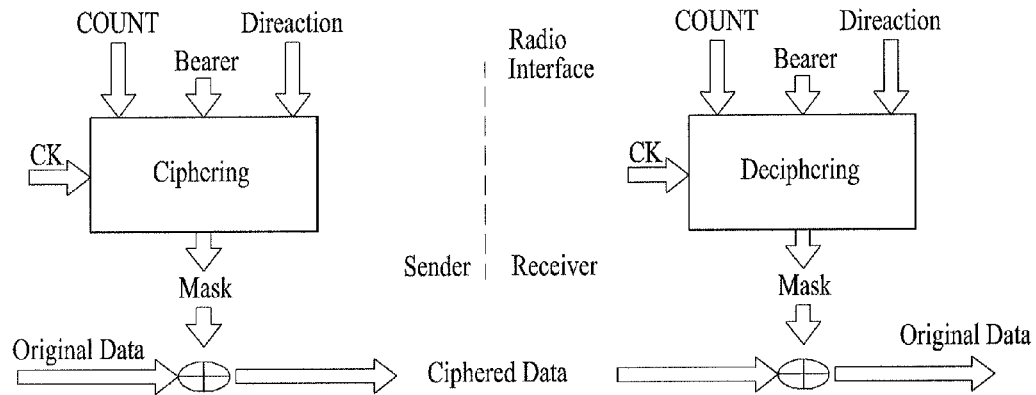
FIG. 6 shows an example of performing ciphering in a PDCP layer.

FIG. 6 shows an example of performing ciphering in a PDCP layer.

Referring to FIG. 6, a PDCP layer of a transmitting side generates ciphered data by covering original data with a MASK. The MASK is a code varied for each of the aforementioned packets. Covering original data with a MASK means that XOR operation for each bit is performed for the original data with respect to MASK. A PDCP layer of a receiving side, which has received the ciphered data, deciphers the original data by again covering the original data with a MASK. The MASK has 32 bits and is generated from several input parameters. In particular, in order to generate different values for respective packets, COUNT is generated using PDCP Serial Number (SN) varied depending on PDCP PDU. The COUNT is used as one of MASK generation input parameters. In addition to the COUNT, examples of the MASK generation input parameters include ID value of a corresponding radio bearer, Direction having an uplink or downlink value, and a ciphering key (CK) exchanged between a user equipment and a network during RB establishment.

Figure 7:
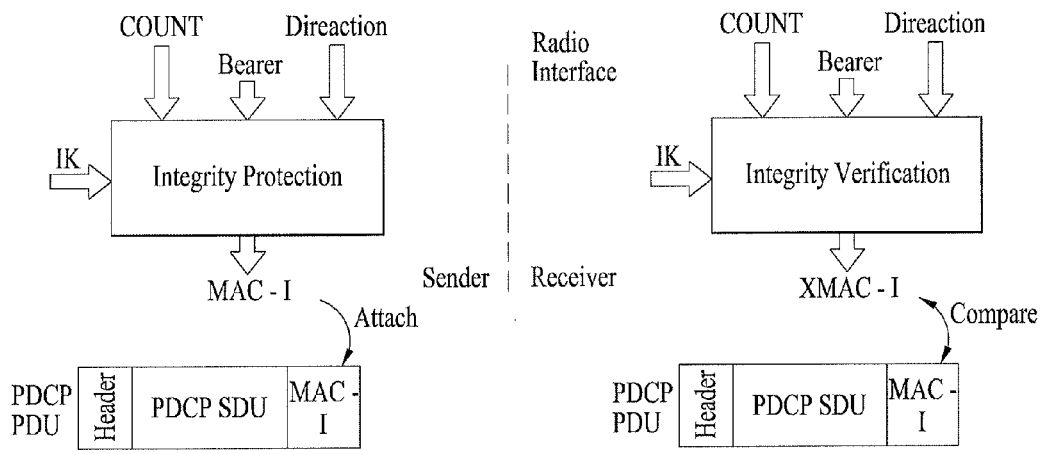
FIG. 7 shows an example of performing integrity protection in a PDCP layer.

FIG. 7 shows an example of performing integrity protection in a PDCP layer.

Referring to FIG. 7, similarly to the ciphering procedure, in an integrity protection procedure, parameters, such as COUNT based on PDCP SN, bearer which is ID value of radio bearer, Direction having an uplink or downlink value, and integrity protection key (IK) exchanged between a user equipment and a network during RB establishment, are used. A Message Authentication Code-Integrity (MAC-I) is generated from a PDCP SDU by using the above parameters. The integrity protection procedure is different from the ciphering procedure in that the MAC-I is added to PDCP SDU not undergoing XOR operation with an original data. The PDCP layer of the receiving side, which has received the MAC-I, generates an expected Message Authentication Code-Integrity (XMAC-I) from the received PDCP SDU by using the same input parameter as that used in the PDCP layer of the transmitting side. Afterwards, XMAC-I is compared with MAC-I, and if two values are equal to each other, it is determined that the data have integrity. If not so, it is determined that the data have been changed.

Figure 8:
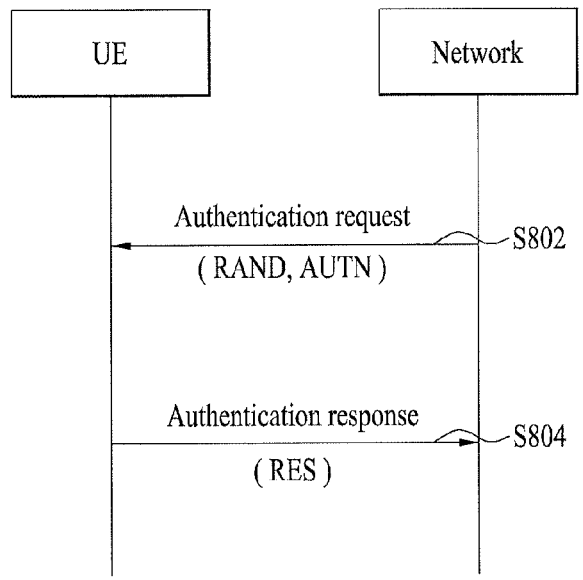
FIG. 8 shows a procedure for authentication and key agreement by using a shared key in 3GPP system.

In 3GPP system, authentication is carried out using symmetric cryptographic mechanism that uses a shared key (K) between a UE and an authentication center. For example, a subscriber authentication key (e.g. a Personal Identification Number, PIN) may be used, and it is stored securely in a Universal Subscriber Identity Module (USIM) of the user equipment. FIG. 8 shows a procedure for authentication and key agreement by using a shared key in 3GPP system. This procedure is used to authenticate a user and establish a new pair of cipher and integrity keys between a network (e.g., a network node such as Visitor Location Register/Serving GPRS Support Node, VLR/SGSN) and the user (in particular, Universal Subscriber Identity Module, USIM of a UE).

Referring to FIG. 8, VLR/SGSN may invoke the procedure by selecting a next unused authentication vector from an ordered array of authentication vectors in database. Authentication vectors are used on a first-in/first-out basis. The VLR/SGSN sends, to the UE, an authentication request including a random challenge (RAND) and an authentication token for network authentication (AUTN) from the selected authentication vector (S802). The RAND may be a 128 bit random number. Upon receipt of the authentication request, the UE verifies integrity of the authentication request. If the integrity of the authentication request is verified, the UE sends, to the VLR/SGSN, an authentication response including a response (RES) (S804).

Figure 9A:
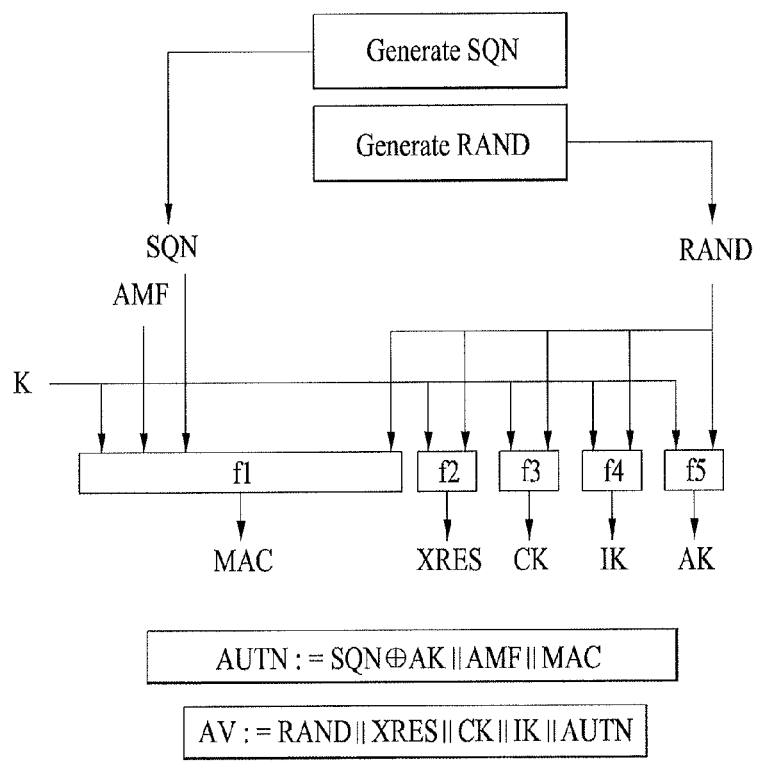
FIG. 9a shows an example of generating authentication vectors by an authentication entity such as Home Environment/Authentication Center (HE/AuC).
Figure 9B:
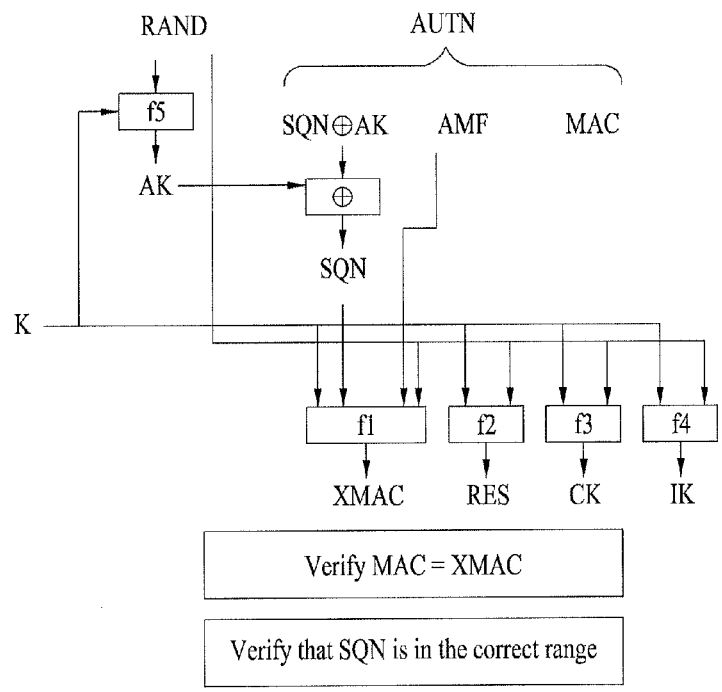
FIG. 9b shows an example of user authentication function in USIM.

FIG. 9a shows an example of generating authentication vectors by an authentication entity such as Home Environment/Authentication Center (HE/AuC). FIG. 9b shows an example of user authentication function in USIM.

Referring to FIG. 9a, the HE/AuC may start with generating a fresh sequence number SQN and an unpredictable challenge RAND. For each user, the HE/AuC keeps track of a counter: $SQN_{HE}$. The use of $SQN_{HE}$ is specific to the method of generation sequence numbers. An Authentication and key Management Field (AMF) is included in the authentication token of each authentication vector. Subsequently the following values are computed:

Message Authentication Code (MAC)=$f1_K$(SQN||RAND||AMF), where f1 is a message authentication function;

Expected Response (XRES)=$f2_K$(RAND), where f2 is a (possibly truncated) message authentication function;

Cipher Key (CK)=$f3_K$(RAND), where f3 is a key generating function;

Integrity Key (IK)=$f4_K$(RAND), where f4 is a key generating function; and

Anonymity Key (AK)=$f5_K$(RAND), where f5 is a key generating function or f5≡0.

K represents a shared key between the USIM and the AuC. For example, K may be a long-term secret key such as a subscriber authentication key (e.g. a PIN).

Finally the authentication token AUTN=SQN⊕AK||AMF||MAC is constructed.

Here, ⊕ represents "exclusive or", and || represents "concatenation". AK is an anonymity key used to conceal the sequence number as the sequence number may expose the identity and location of the user. Concealment of the sequence number is to protect against passive attacks only. If no concealment is needed, then f5≡0 (AK=0).

Referring to FIG. 9b, the USIM first computes AK=$f5_K$(RAND) and retrieves the sequence number SQN=(SQN⊕AK)⊕AK. Next the USIM computes XMAC=$f1_K$(SQN||RAND||AMF) and compares this with MAC which is included in AUTN. If they are same, the user sends an authentication response message including a response (RES)

back to the VLR/SGSN (see, S804). If they are different, the user sends an authentication failure message back to the VLR/SGSN with an indication of the cause and the user abandons the procedure. In this case, the VLR/SGSN may initiate an Authentication Failure Report procedure towards a Home Location Register (HLR). The VLR/SGSN may also decide to initiate a new identification and authentication procedure towards the user.

Figure 10:
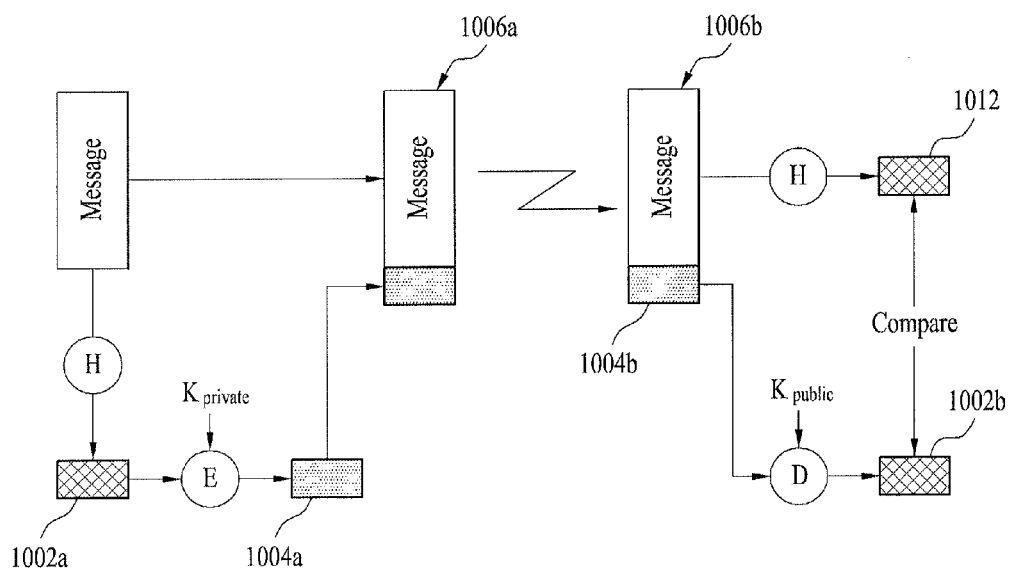
FIG. 10 shows an example of performing authentication using a private/public key pairs.

FIG. 10 shows an example of performing authentication using a private/public key pairs.

Referring to FIG. 10, a Message Authentication Code (MAC) 1002*a* is generated from an original message by using a hashing process (H). The hashing process (H) may be performed based on a hashing algorithm, e.g., Source Hash Algorithm (SHA). A Message Authentication Code-Authentication (MAC-A) 1004*a* is generated from the MAC 1002*a* through encryption (E) using a private key, $K_{private}$, then MAC-A 1004*a* is added to the original message, which results in a data block 1006*a*. At a receiving side, an expected MAC (XMAC) 1012 is generated from a message of the received data block 1006*b*, and a MAC 1002*b* is generated from the MAC-A 1004*b* through decryption (D) using a public key, $K_{public}$, which corresponds to the private key. Afterwards, the XMAC 1012 is compared with the MAC 1002*b*, and if they are same, the authentication is a success. If not so, the authentication is a failure.

Recently, Proximity-based Service (ProSe) has been discussed in 3GPP. The ProSe enables different UEs to discover each other (if authorized to do so) and to be connected (directly) to each other (after appropriate procedure(s), such as authentication), connected through a local eNB only (but not further through Serving Gateway (SGW)/Packet Data Network Gateway (PDN-GW, PGW)), or connected through SGW/PGW (this is referred to as EPC (Evolved Packet Core) Path in 3GPP Release 12).

Figure 11:
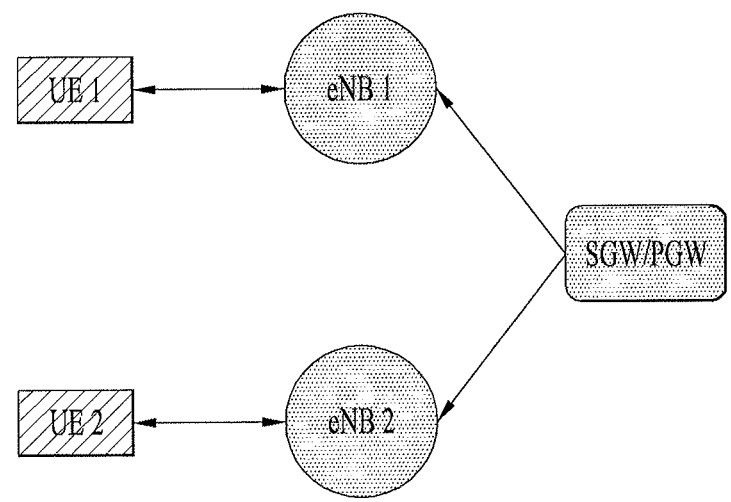
FIGS. 11~13 illustrate data path scenarios for a proximity communication.
Figure 12:
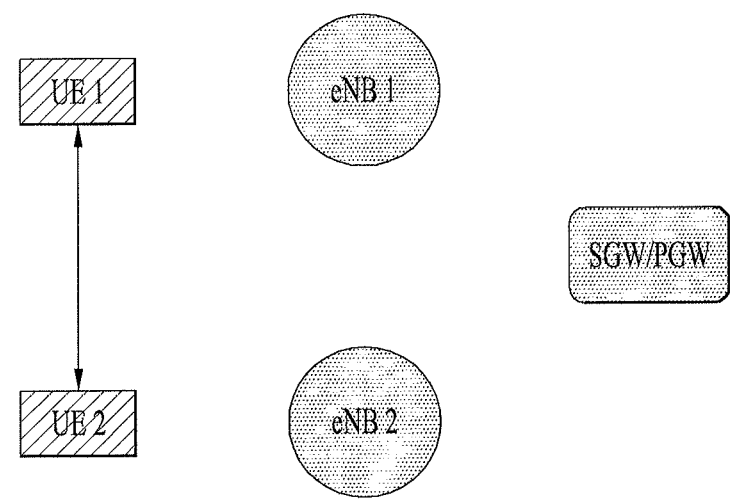
Figure 13:
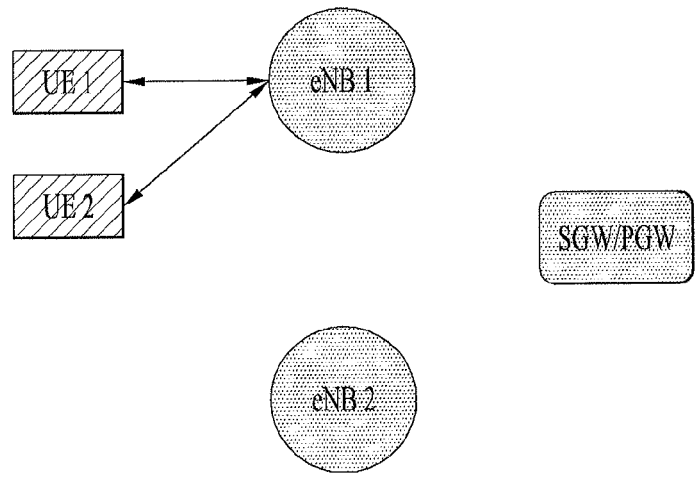

FIGS. 11~13 illustrate Communication Path (or data path) scenarios for a ProSe.

FIG. 11 shows an EPC Path (or a default data path) in Evolved Packet System (EPS) for communication between two UEs (Scenario 1). When two UEs (e.g., UE1, UE2) in close proximity communicate with each other, their data path (user plane) goes via the operator network. Typical data path for this type of communication involves eNB(s) and/or Gateway(s) (GW(s)) (e.g., SGW/PGW). FIGS. 12~13 show ProSe Communication Paths for a proximity communication (Scenario 2). If wireless devices (e.g., UE1, UE2) are in proximity of each other, they may be able to use a direct ProSe Communication Path (FIG. 12) or a locally routed ProSe Communication Path (FIG. 13) for communication between two UEs. In the direct ProSe Communication Path, wireless devices are connected directly each other (after appropriate procedure(s), such as authentication), without being connected to/through eNB and SGW/PGW. In the locally routed ProSe Communication Path, wireless devices are connected to each other through a local eNB only but not through the SGW/PGW.

The ProSe has various use cases and potential requirements for an operator network controlled discovery and communications between wireless devices that are in proximity, under continuous network control, and are served by E-UTRAN, for:

1. Commercial/social use
2. Network offloading
3. Public Safety
4. Integration of current infrastructure services, to assure the consistency of the user experience including reachability and mobility aspects
5. Public Safety, in case of absence of E-UTRAN coverage (subject to regional regulation and operator policy, and limited to specific public-safety designated frequency bands and terminals)

ProSe is useful especially for Public Safety use cases. Public Safety has a wide spectrum of applications. For example, in the United States, it includes the following:

Fire and Rescue services—includes fire prevention and suppression, all types of rescue services.

Ambulance and Emergency Medical Service (EMS)—usually only provides emergency medical transportation Police and security guard licensing services—including crime prevention, suppression and investigation, uniformed patrol and response, and operates the Crimestoppers Program.

Emergency communications—operates the public interface emergency communications telephone system by providing the 9-1-1 and Enhanced 911 emergency telephone numbers.

Office of Emergency Services (OES)—plans for and operates the Emergency Operations Center during calamities, disasters, special events and emergencies.

Inspections and code enforcement—usually building safety, which includes construction, electrical et al. and/or vehicle inspections.

Animal control—This category could also include wildlife officers, game wardens and dog catchers.

DMV—includes administration of driver's licenses and license plates.

Example

Integrity Protection for ProSe Discovery

In order to initiate ProSe communication, ProSe-enabled UEs firstly have to discover other ProSe-enabled UE in proximity (e.g., a crime scene, a firescene). In general, a ProSe discovery procedure includes: (a) a UE (i.e., ProSe discovering UE) sends a message (e.g., discovery message, simply message1 or msg1) for ProSe discovery when it needs to initiate a ProSe communication path with other UE (i.e., ProSe discovered UE), (b) if the ProSe discovered UE receives the message1, it sends a message (e.g., discovery response message, simply message2 or msg2) for responding to the ProSe discovering UE. After the ProSe discovery procedure succeeded, ProSe UEs may negotiate their ProSe capabilities and perform authentication to establish the ProSe direct communication path between them.

Figure 14:
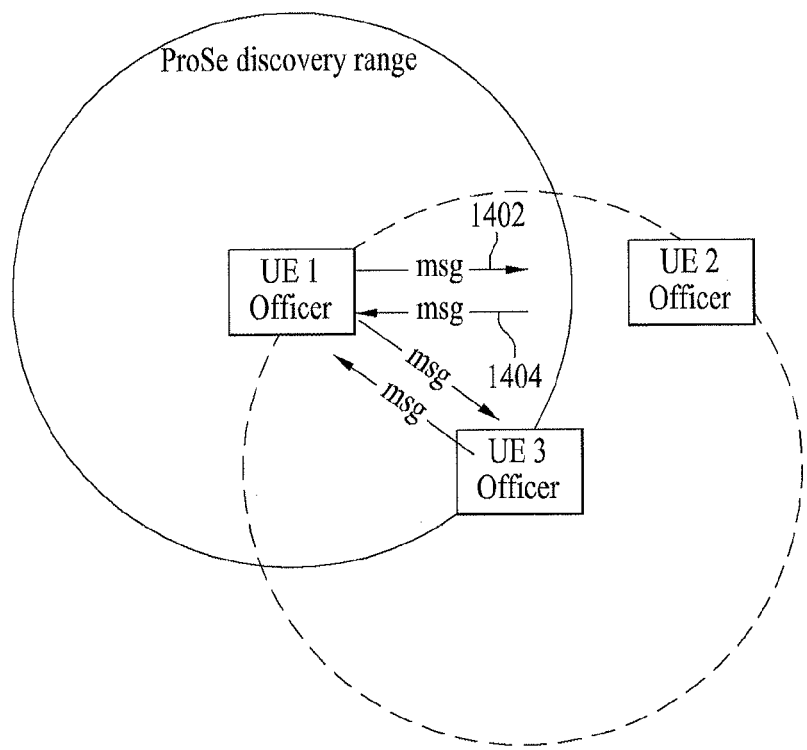
FIGS. 14~15 show ProSe discovery procedures in accordance with previous arts.
Figure 15:
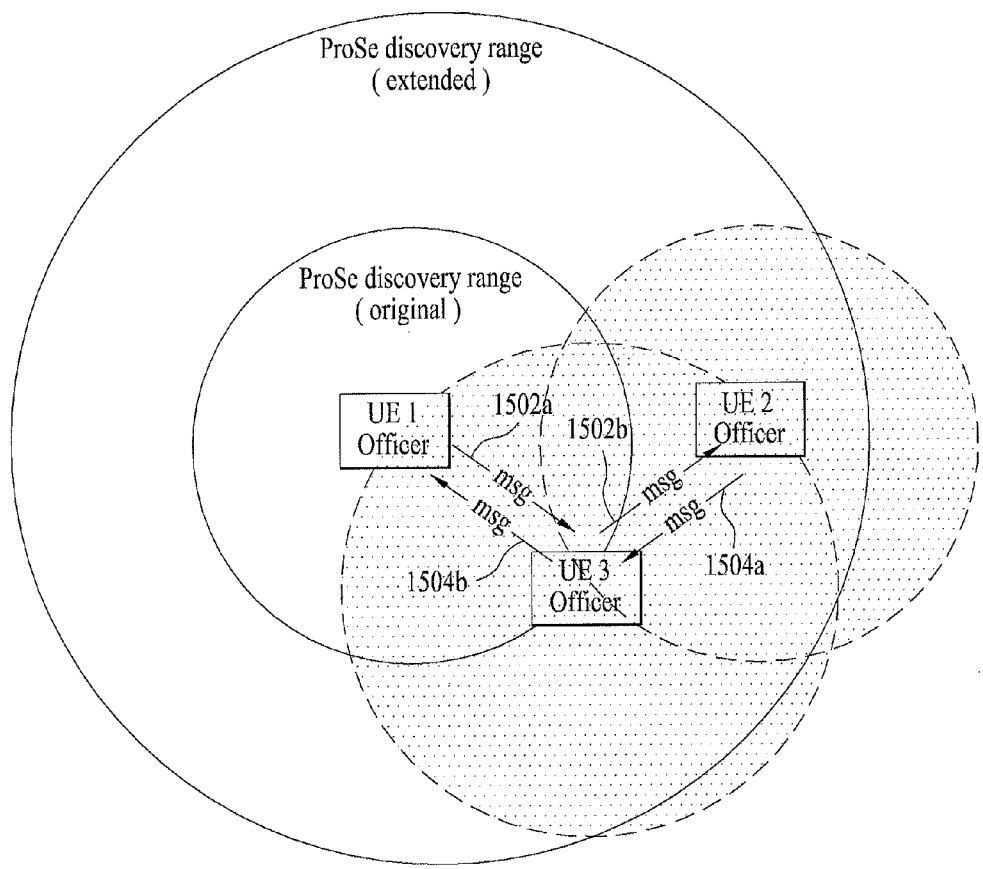

FIGS. 14~15 show ProSe discovery procedures in accordance with previous arts. It is assumed that there are N Officers dispatched to an area of mission (N is a natural number).

Referring to FIG. 14, an officer cannot discover another officer located out of its proximity range (or ProSe discovery range) (e.g., coverage of message1). For example, Officer UE1 does not have Officer UE2 in its proximity, thus cannot discover Officer UE2. That is, a discovery message (i.e., msg1) 1402 from the Officer UE1 could not reach to the Officer UE2, and/or a discovery response message (i.e., msg2) 1404 from the Officer UE2 could not reach to the Officer UE1. In this situation, if Officer UE1 needs to find Officer UE2 at the scene, Officer UE1 has no options but physically moving around with ProSe-enabled until Officer UE2 comes in the proximity range to be discovered.

However, as shown in FIG. 15, if a neighboring Officer (e.g., Officer UE3) who is located within the proximity of Officer UE1 is allowed to convey a discovery message (i.e., msg1) (e.g., "where are you Officer UE2?" message) coming from Officer UE1 to any of Officer UE3's neighboring Officers (1502a, 1502b), then the conveying action of an Officer-in-the-middle (e.g., Officer UE3) can increase the possibility that Officer UE2 can receive the discovery message through the conveying help of the Officer-in-the-middle (e.g., Officer UE3). In a similar way, a neighboring Officer (e.g., Officer UE3) who is located within the proximity of Officer UE2 is allowed to convey a discovery response message (i.e., msg1) (e.g., "I (Officer UE2) am here" message) coming from Officer UE2 to any of Officer UE3's neighboring Officers (1504a, 1504b). This method could extend the geographical ProSe discovery range (i.e., extended ProSe discovery range).

In the above case that Officer UE1's discovery message has been received by Officer UE2 through the Officer-in-the-middle (Officer UE3), the Officer UE2 may believe that Officer UE1 is trying to reach Officer UE2 itself. However, the conventional ProSe discovery procedure has a problem that the discovery message can be originated by an unauthorized user since authentication procedure is performed after the ProSe discovery procedure. For example, in a case of FIG. 15, another Officer-in-the-middle (e.g., hacker UE) may overhear the discovery message 1502a from Officer UE1, and can convey a modified discovery message 1502b to neighboring Officers. The modified discovery message may have modified information, e.g., modified information about a seeker UE, modified information about a target UE, modified contents, and the like. In a similar way, another Officer-in-the-middle (e.g., hacker UE) may overhear the discovery response message 1504a from Officer UE2, and conveys a modified discovery response message 1504b to neighboring Officers. The modified discovery response message may also have modified information, e.g., modified information about a seeker UE, modified information about a target UE, modified contents, and the like.

In order to address the problem of the conventional ProSe discovery procedure, the present invention proposes to encrypt a discovery message for integrity, by which it is prevented that the discovery message is originated by unauthorized user. However, key exchange is generally performed in a separate procedure (e.g., authentication procedure) after the ProSe discovery procedure is completed. Thus an encrypted discovery message could not be properly restored at a receiving side since the decoding side does not know yet a key related with decryption. In order to address this problem, the present invention also proposes to encrypt the discovery message using a private key, and include a public key corresponding to the private key into the discovery message. Asymmetric cryptographic mechanisms such as RSA scheme may be used for the encryption/decryption using the private/public key pair (see, FIG. 10).

Encryption may be applied to a Message Authentication Code (MAC) generated from at least part of the discovery message. For example, the discovery message may include an authentication request, and the MAC may be generated from the authentication request. The authentication request in the discovery message may be generated in a same way as explained in FIG. 9a, except the secret shared key K. The secret shared key K in FIG. 9a is only known to a UE and an authentication center, thus it cannot be used in discovery procedure between UEs. Thus the shared key K may be replaced with a key K' in ProSe discovery procedure. The key K' may be a predetermined value (e.g., all '1's or all '0's), a ProSe-specific value, and the like. The ProSe-specific value may be given per Pro-Se group, ProSe-usage (e.g., fire, crime). The K'(s) may be hardwired or signaled using a broadcast message. A ProSe-enabled UE may have a set of K's for identifying ProSe-group(s), ProSe-usage(s), and the like. Decryption is applied to a received discovery message at a receiver (e.g., Officer-in-the-middle, a target Office UE) in a reverse way. The discovery message may include information about target Office UE(s). In this case, the receiver can convey the discovery message if it is not a target of the discovery message. Even though the receiver is a target of the discovery message, if the discovery message includes information about another target(s), the receiver can also convey the discovery message to neighboring UEs. Alternatively, a receiver may perform blind decryption to the discovery message using a set of K's. In this case, the receiver can convey the discovery message to neighboring UEs, if decryption (i.e., integrity) succeeded with K' #i but if K' #i is different from an expected K' in consideration of ProSe-group, ProSe-usage and the like.

When the discovery message from a seeker UE is successfully authenticated, a target UE may transmit a discovery response message in response to the discovery message. Substantially identical operations may be applied to a discovery response message at the target UE. In this case, the discovery response message is encrypted using a private key of the target UE, and a paired public key is included in the discovery response message. The discovery response message may include an authentication response (RES), and the RES may be encrypted using a private key of the target UE. In generation of RES and XRES (see, FIGS. 9A and 9B), the secret shared key K is replaced with K' above.

Figure 16:
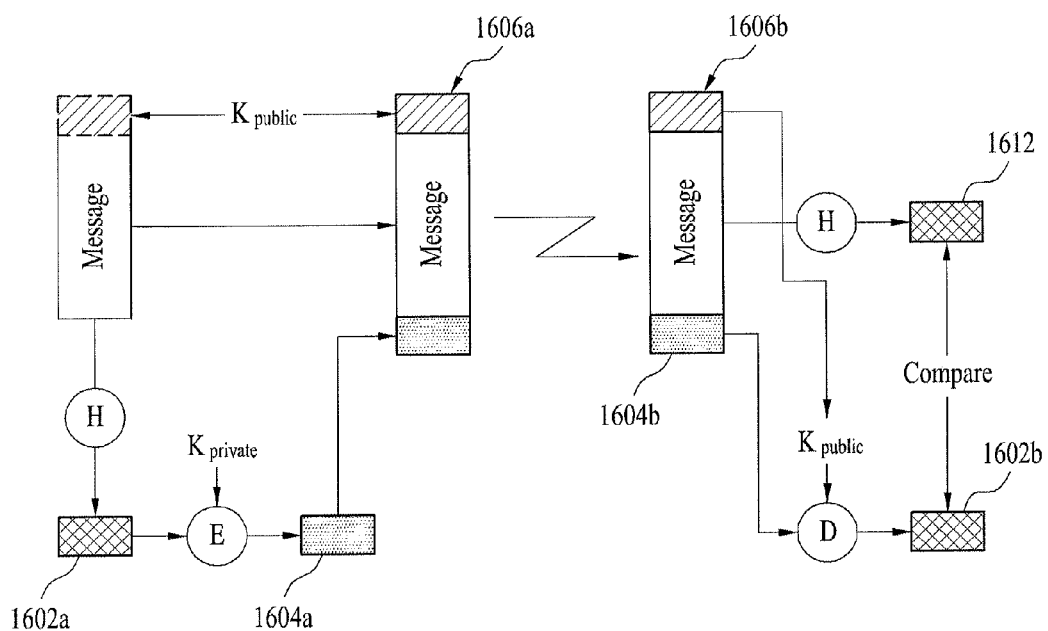
FIG. 16 shows procedures of generating a discovery message at a sender and processing the discovery message at a receiver for integrity in accordance with the present invention.

FIG. 16 shows procedures of generating a discovery message at a sender and processing the discovery message at a receiver for integrity in accordance with the present invention.

Referring to FIG. 16, a specific code, e.g., Message Authentication Code (MAC) 1602a may be generated from an original message by using a hashing process (H). The original message may be at least part of a payload of the discovery message, e.g., ProSe authentication request. The hashing process (H) may be performed based on a hashing algorithm, e.g., Source Hash Algorithm (SHA). A Message Authentication Code-Authentication (MAC-A) 1604a is generated from the MAC 1602a through encryption (E) using a private key, $K_{private}$, then MAC-A 1604a is added to the original message. In addition, in accordance with the present invention, a public key, $K_{public}$, corresponding to the private key, $K_{private}$, is added to a predetermined position of the MAC-A 1604a and the original message, which results in a data block 1606a. For example, the predetermined position may be a starting position or an ending position of the original message. At a receiving side, an expected MAC (XMAC) 1612 is generated from a message of the received data block 1606b, and a MAC 1602b is generated from the MAC-A 1604b through decryption (D) using a public key, $K_{public}$ in the received data block 1606b, which corresponds to the private key, $K_{private}$. The XMAC 1612 is compared with the MAC 1602b, and if they are same, the authentication is a success. If not so, the authentication is a failure.

Figure 17:
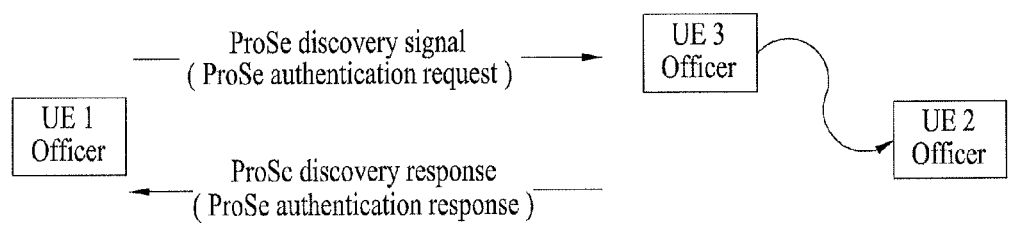
FIGS. 17~18 show examples of ProSe discovery procedures in accordance with the present invention.
Figure 18:
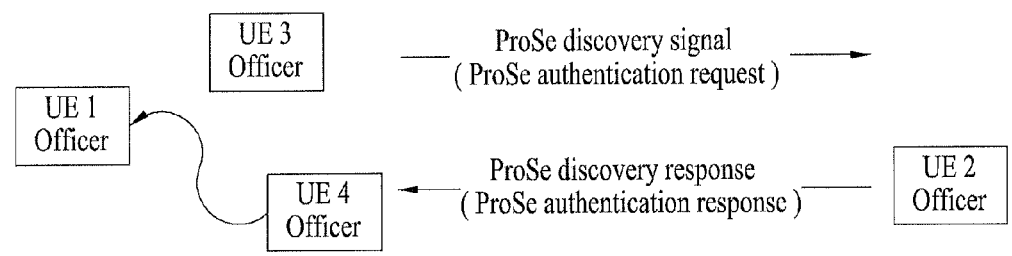

FIGS. 17~18 show examples of ProSe discovery procedures in accordance with the present invention. As shown in FIGS. 17~18, it is assumed that there are N Officers dispatched to an area of mission (N is a natural number) and, for any reason, the Officer UE1 (Seeker) needs to find Officer UE2(Target of Seeker) which is not in its proximity. That is, the Officer UE2 is not in a proximity range to be directly discovered by the Officer UE1.

Referring to FIG. 17, when Officer UE1 attempts to discover Officer UE2, Officer UE1 may include a ProSe authentication request in a ProSe discovery message. Officer UE1 may perform integrity protection on the ProSe authentication request message using its private key and add a paired public key before sending out. If Officer UE3 overhears of the ProSe discovery message, Officer UE3 may conveys the ProSe discovery message to neighboring Officers. Two cases can be considered.

Case 1: If Officer UE2 is NOT within the proximity of Officer UE3, then no action is made by Officer UE2.

Case 2: If Officer UE2 is within the proximity of Officer UE3, then Officer UE2 may send a ProSe authentication response to Officer UE1, optionally through Officer UE3 or other neighboring Officer UEs. In this case, Officer UE2 may perform integrity protection on the ProSe authentication response message using its private key and add a paired public key before sending out. Officer UE2 does not have to send the ProSe authentication response to the same Officer UE (i.e., Officer UE3) that it received the ProSe authentication request message from. This means that Officer UE2 does not have to identify who the Officer UE3 is and that Officer UE2 is responding regardless of having knowledge on the existence of any officers within its proximity. Therefore, Case 2.1 (FIG. 17): if Officer UE1 is, by chance, moving and entering the proximity range of Officer UE2, Officer UE1 can receive the ProSe authentication response directly from Office UE2 and successfully discover Officer UE2.

Case 2.2 (FIG. 18): if Officer UEx (UEx can be UE3 or other neighboring UE (e.g., Officer UE4)) is in the proximity of Officer UE2, it can attempt to convey the Officer UE2's ProSe authentication response message to neighboring Officer UEs.

With the proposed method, it can be achieved to provide integrity-protected discovery within one time of handshaking with extended ProSe discovery range.

Figure 19:
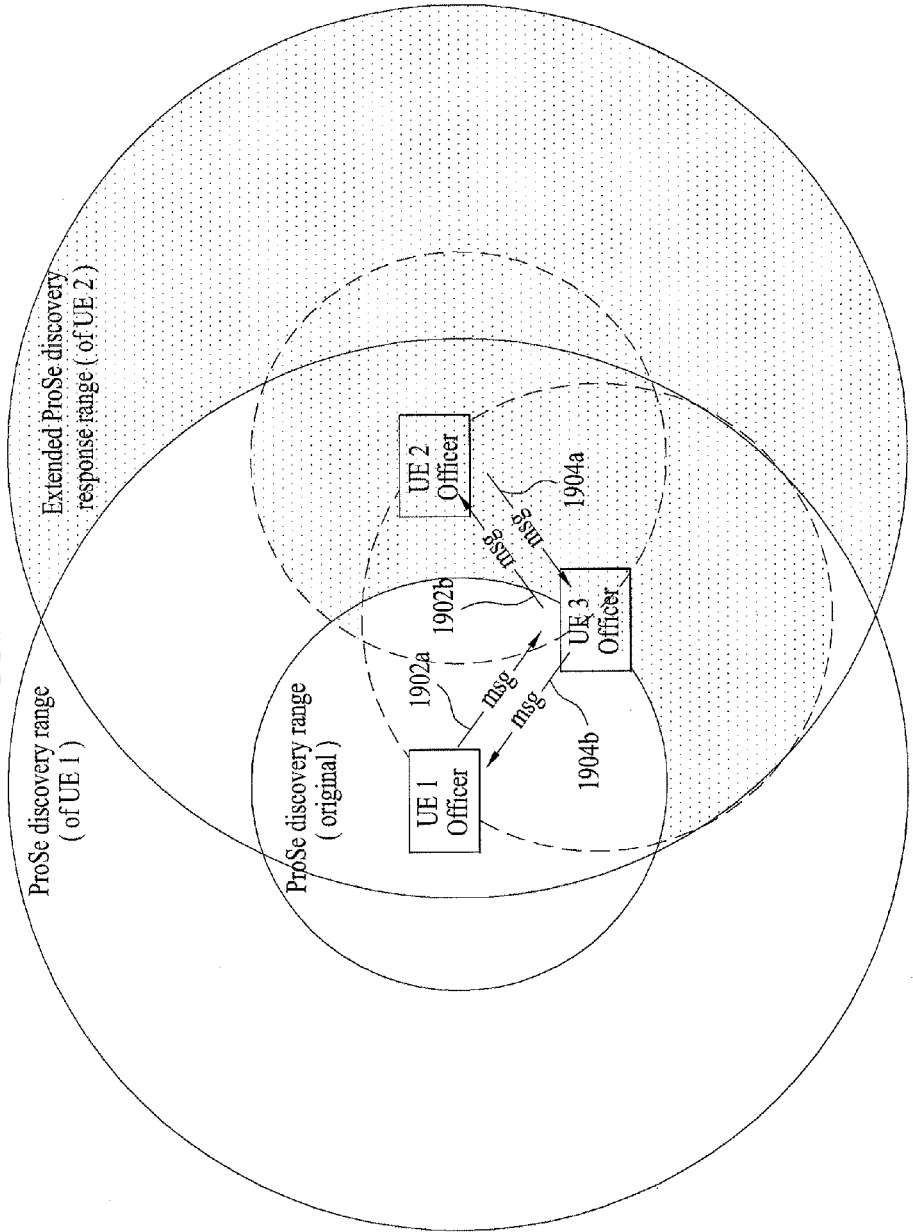
FIG. 19 shows an example of performing an integrity-protected ProSe discovery in accordance with the present invention.

FIG. 19 shows an example of performing an integrity-protected ProSe discovery in accordance with the present invention.

Referring to FIG. 19, a neighboring Officer (e.g., Officer UE3) who is located within the proximity of Officer UE1 may be allowed to convey a discovery message (i.e., msg1) (e.g., "where are you Officer UE2?" message) coming from Officer UE1 to any of Officer UE3's neighboring Officers. In this case, Officer UE3 may overhear a discovery message 1902a of Office UE1, and then convey the discovery message 1902b to neighboring Officer UEs. Here, the discovery message 1902a and 1902b includes a payload encrypted using a private key of Officer UE1 for integrity protection, and also includes a public key of Officer UE1 in a similar way, a neighboring Officer (e.g., Officer UE3) who is located within the proximity of Officer UE2 is allowed to convey a discovery response message (i.e., msg1) (e.g., "I (Officer UE2) am here" message) coming from Officer UE2 to any of Officer UE3's neighboring Officers (1904a, 1904b). Here, the discovery response message 1904a and 1904b includes a payload encrypted using a private key of Officer UE2 for integrity protection, and also includes a public key of Officer UE2. Above procedure can be achieved within one round-trip if a seeker (Officer UE1) and a target of the seeker (Officer UE2) are within an extended ProSe discovery range. By the proposed integrity-protected ProSe discovery procedure, an extended geographical ProSe discovery range (i.e., extended ProSe discovery range) with integrity protection can be provided.

Proposed method can also be utilized for commercial use cases. However, due to the higher volume of discovery control data, the propose method can perform better in public safety environment from the operational complexity perspectives.

Figure 20:
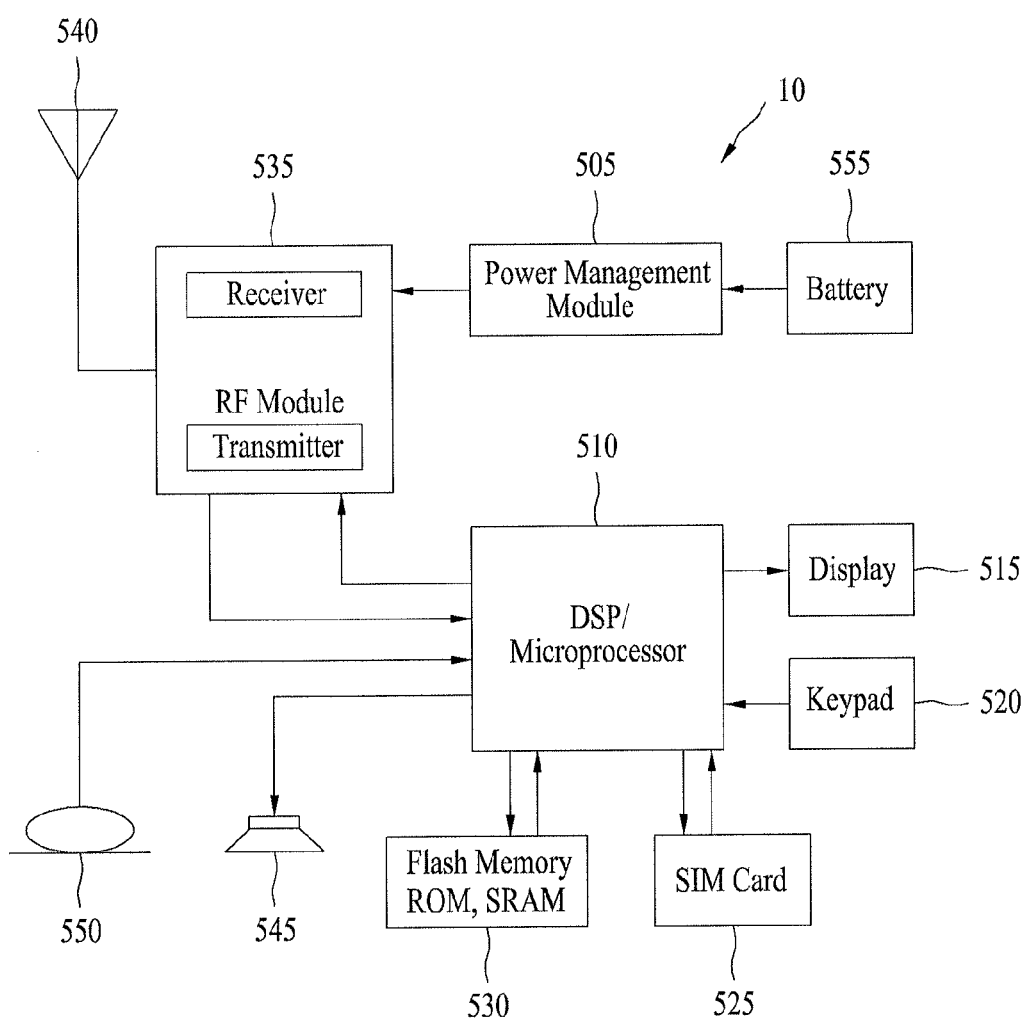
FIG. 20 illustrates a block diagram of a User Equipment (UE).

FIG. 20 illustrates a block diagram of a UE or Mobile Station (MS) 10. The UE 10 includes a MTC device or a delay-tolerant device. The UE 10 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the BS (or eNB) as the case may be. In other words, it will be apparent that various operations performed for communication with the UE in the network which includes a plurality of network nodes along with the BS (or eNB) can be performed by the BS or network nodes other than the BS (or eNB). The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a method and an apparatuses for aproximity-based service, specifically, a proximity-based service for public safety.

The invention claimed is:

1. A method of processing a message by a first Proximity-based Service (ProSe)-enabled User Equipment (UE) in a cellular communication system, the method comprising:
without an exchange of a secret shared key with a seeker ProSe-enabled UE, receiving a ProSe discovery message including a Message Authentication Code (MAC) encrypted by a private key of the seeker ProSe-enabled UE, a plain message, information about at least one target ProSe-enabled UE and a public key corresponding to the private key;
blind decrypting the MAC encrypted by the private key of the seeker ProSe-enabled UE using the public key corresponding to the private key and plural keys corresponding to ProSe groups to which the first ProSe-enabled UE belongs, wherein each of the plural keys is used instead of the secret shared key;
if the blind decrypting succeeds with a non-expected key of the plural keys that is not associated with the first Pro-Se-enabled UE, forwarding the received ProSe discovery message to the at least one target ProSe-enabled UE; and
if the blind decrypting succeeds with an expected key of the plural keys, transmitting a ProSe discovery response message to the seeker ProSe-enabled UE as a response to the ProSe discovery message,
wherein the at least one target ProSe-enabled UE is not in a discovery range of the seeker ProSe-enabled UE.

2. The method of claim 1, wherein the plain message in the ProSe discovery message includes an authentication request including a random number and an authentication token.

3. A first Proximity-based Service (ProSe)-enabled User Equipment (UE) configured to process a message in a wireless communication system, the first ProSe-enabled UE comprising:
a radio frequency (RF) unit; and
a processor operably coupled to the RF unit,
wherein the processor is configured to:
without an exchange of a secret shared key with a seeker ProSe-enabled UE, receive a ProSe discovery message including a Message Authentication Code (MAC) encrypted by a private key of the seeker ProSe-enabled UE, a plain message, information about at least one target ProSe-enabled UE and a public key corresponding to the private key,
blind decrypt the MAC encrypted by the private key of the seeker ProSe-enabled UE using the public key corresponding to the private key and plural keys corresponding to ProSe groups to which the first ProSe-enabled UE belongs, wherein each of the plural keys is used instead of the secret shared key,
if the blind decryption succeeds with a non-expected key of the plural keys that is not associated with the first Pro-Se-enabled UE, forward the received ProSe discovery message to the at least one target ProSe-enabled UE, and
if the blind decryption succeeds with an expected key of the plural keys, transmit a ProSe discovery response message to the seeker ProSe-enabled UE as a response to the ProSe discovery message,
wherein the at least one target ProSe-enabled UE is not in a discovery range of the seeker ProSe-enabled UE.

4. The first ProSe-enabled UE of claim 3, wherein the plain message in the encrypted ProSe discovery message includes an authentication request including a random number and an authentication token.

* * * * *